United States Patent
Lewis

(10) Patent No.: US 10,150,375 B2
(45) Date of Patent: Dec. 11, 2018

(54) METHOD FOR PAIRING WIRELESS CHARGING SYSTEM TO VEHICLE

(71) Applicants: Hyundai America Technical Center, Inc., Superior Township, MI (US); Hyundai Motor Company, Seoul (KR); Kia Motors Corporation, Seoul (KR)

(72) Inventor: Allan Lewis, Superior Township, MI (US)

(73) Assignees: Hyundai America Technical Center, Inc., Superior Township, MI (US); Hyundai Motor Company, Seoul (KR); Kia Motors Corporation, Seoul (KR)

(*) Notice: Subject to any disclaimer, the term of this patent is extended or adjusted under 35 U.S.C. 154(b) by 325 days.

(21) Appl. No.: 14/256,420

(22) Filed: Apr. 18, 2014

(65) Prior Publication Data
US 2015/0298558 A1 Oct. 22, 2015

(51) Int. Cl.
*B60L 11/18* (2006.01)

(52) U.S. Cl.
CPC ......... *B60L 11/182* (2013.01); *B60L 11/1829* (2013.01); *B60L 11/1833* (2013.01); *B60L 11/1838* (2013.01); *B60L 11/1846* (2013.01); *Y02T 10/7005* (2013.01); *Y02T 10/7072* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(58) Field of Classification Search
None
See application file for complete search history.

(56) References Cited

U.S. PATENT DOCUMENTS

| | | | |
|---|---|---|---|
| 2007/0184852 A1* | 8/2007 | Johnson | H04W 64/00 455/456.1 |
| 2010/0317371 A1 | 12/2010 | Westerinen et al. | |
| 2011/0191265 A1 | 8/2011 | Lowenthal et al. | |
| 2011/0254503 A1* | 10/2011 | Widmer | B60L 11/182 320/108 |

(Continued)

FOREIGN PATENT DOCUMENTS

| | | | |
|---|---|---|---|
| JP | 2013-225969 A | | 10/2013 |
| JP | 2013225969 A | * | 10/2013 |

(Continued)

OTHER PUBLICATIONS

Office Action dated Mar. 21, 2016 in corresponding KR Application No. KR 10-2015-0031873.

*Primary Examiner* — Shelley Chen
(74) *Attorney, Agent, or Firm* — Mintz Levin Cohn Ferris Glovsky and Popeo, P.C.; Peter F. Corless

(57) ABSTRACT

A method for pairing a wireless charging system to a vehicle, includes: determining location coordinates of a target position of a vehicle parking space within a parking lot; storing the location coordinates of a center of the parking space; receiving a signal including location coordinates of the vehicle; and determining a location match using the location coordinates of the center of the parking space and the location coordinates of the vehicle to pair the wireless charging system to the vehicle.

6 Claims, 3 Drawing Sheets

(56) References Cited

U.S. PATENT DOCUMENTS

| | | | | |
|---|---|---|---|---|
| 2015/0015419 A1* | 1/2015 | Halker | ............... | B60L 11/1827 340/901 |
| 2015/0018018 A1* | 1/2015 | Shen | ...................... | H04W 4/04 455/457 |
| 2015/0042168 A1* | 2/2015 | Widmer | ............. | B60L 11/1829 307/104 |
| 2015/0073636 A1* | 3/2015 | Machino | ............ | G01C 21/3469 701/22 |
| 2015/0073642 A1* | 3/2015 | Widmer | ............ | G01C 21/3635 701/22 |

FOREIGN PATENT DOCUMENTS

| | | | | |
|---|---|---|---|---|
| JP | 2013225969 A | * | 10/2013 | .......... B60L 11/1829 |
| KR | 10-2012-0036844 | | 4/2012 | |
| KR | 10-2012-0120223 | | 11/2012 | |
| KR | 10-2013-0046692 | | 5/2013 | |
| WO | 2013/145214 A1 | | 10/2013 | |

* cited by examiner

METHOD FOR PAIRING WIRELESS CHARGING SYSTEM TO VEHICLE

BACKGROUND (a) Field of the Invention

The present invention relates to a method for pairing a wireless charging system to a vehicle, and more particularly, to a method that is capable of determining a parking space by transmitting/receiving a signal including positional information related to the parking space.

(b) Description of the Related Art

Because of problems such as environmental pollution and limited energy resources, eco-friendly vehicles have been emphasized. Therefore, an electric vehicle which is an eco-friendly, high-energy efficiency vehicle has been developed to address demand for such eco-friendly vehicles. Recently, as a result of improvement in performance and cost savings achieved in battery technology, and the like, the electric vehicle has realized greater acceptance as a general use vehicle. The electric vehicle does not emit $CO_2$ or other pollutants while being driven, and thus has excellent environmental performance and other advantages such as a responsive, strong acceleration performance, and a quiet, smooth drive feeling. An essential component to an electric vehicle that is used to commercialize the electric vehicle is a charger to charge a battery. The charger is installed in an electric vehicle charging station, a public parking lot, and the like. Generally, when a charger is installed in a public parking lot, there are at least two common arrangements: (1) a stand type in which a charger is fixed to a floor, and (2) a wall mounted type in which a charger is mounted on a wall.

However, since the stand type charger requires a separate ground space, the number of parking spots in a public parking lot may be reduced, and in the case of an existing public parking lot, it is difficult to secure a mounting space. Further, when the charger is installed in the state in which adequate space is not secured, the vehicle may bump against the charger at the time of parking the vehicle, and thus the vehicle and the charger may be damaged.

Further, in the case of the wall mounted type, the charger does not occupy ground space, and therefore may be more easily mounted than the stand type charger. However, the wall mounted type charger is fixed on the wall, and therefore is useful only for vehicles parked in the parking spot(s) close to the place where the charger is installed, and the electric vehicle parked in a parking spot far from the vehicle may not be charged. To solve the above problem, when an electric vehicle parking lot is separately allocated in the public parking lot, parking efficiency may be degraded and thus drivers may render complaints.

SUMMARY

Accordingly, the present invention has an object to provide a method for pairing a wireless charging system to a vehicle capable of providing a parking space for wireless charging by updating parking information provided from a plurality of signals within a parking lot.

In one aspect of the present invention, there is provided a method for pairing a wireless charging system to a vehicle, including: transmitting, by a processor, a first signal including positional information related to a parking space within a parking lot; receiving, by the processor, a second signal which is transmitted from the vehicle through the processor and includes a received signal strength indicator (RSSI) array; determining, by the processor, a position of the parking space based on the received second signal; comparing, by the processor, the RSSI array previously stored with the RSSI array included in the second signal; determining, by the processor, whether the RSSI array previously stored matches the RSSI array included in the second signal by using a signal processing algorithm; and transmitting, by the processor, a third signal which provides a notification on the matching between the RSSIs indicating the pairing of the wireless charging system to the vehicle, to the vehicle, wherein the array is determined from a plurality of signals which are present within the parking lot.

The first signal may be transmitted from the vehicle.

The method for pairing a wireless charging system to a vehicle may further include: if it is determined that the RSSI array previously stored does not match the RSSI array included in the second signal, storing, by the processor, the unmatched RSSI array.

The method for pairing a wireless charging system to a vehicle may further include: recognizing, by the processor, an RSSI pattern of the RSSI array included in the second signal; and storing, by the processor, the RSSI pattern.

The RSSI pattern may be based on a surrounding environment condition.

The RSSI pattern may be based on a repetitive parking attempt of the vehicle.

The method for pairing a wireless charging system to a vehicle may further include: using a global positioning system (GPS) for pairing the wireless charging system to the vehicle.

In another aspect of the present invention, there is provided a method for pairing a wireless charging system to a vehicle, including: determining, by a processor, position coordinates of a targeted position of a vehicle parking space within a parking lot; storing, by the processor, a central position coordinate of the parking space; receiving, by the processor, a signal including the position coordinates of the vehicle; and determining, by the processor, whether the positions are matched using the central position coordinate of the parking space and the position coordinates of the vehicle for pairing the wireless charging system to the vehicle.

The vehicle parking space may be positioned between a plurality of parking spaces.

The targeted position may be positioned at a center in the parking space.

The vehicle may include a GPS system.

The position coordinates may be longitude and latitude coordinates.

The processor may be included in a controller which is closely positioned to the parking space.

The processor may determine whether the positions are matched using a signal processing algorithm.

A non-transitory computer readable medium containing program instructions executed by a processor on a controller may include: program instructions that transmit by a first signal including location information related to a parking space within a parking lot; program instructions that receive a second signal from the vehicle including an array of received signal strength indicators (RSSI), wherein the array is determined from a plurality of signals within the parking lot; program instructions that determine a location of the parking space based on the received second signal; program instructions that compare the array of RSSI with previously stored arrays of RSSI; program instructions that determine a match between the array of RSSI and a previously stored array of RSSI using a signal processing algorithm; and program instructions that transmit a third signal providing a match notification to the vehicle that indicates the pairing of the wireless charging system to the vehicle.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
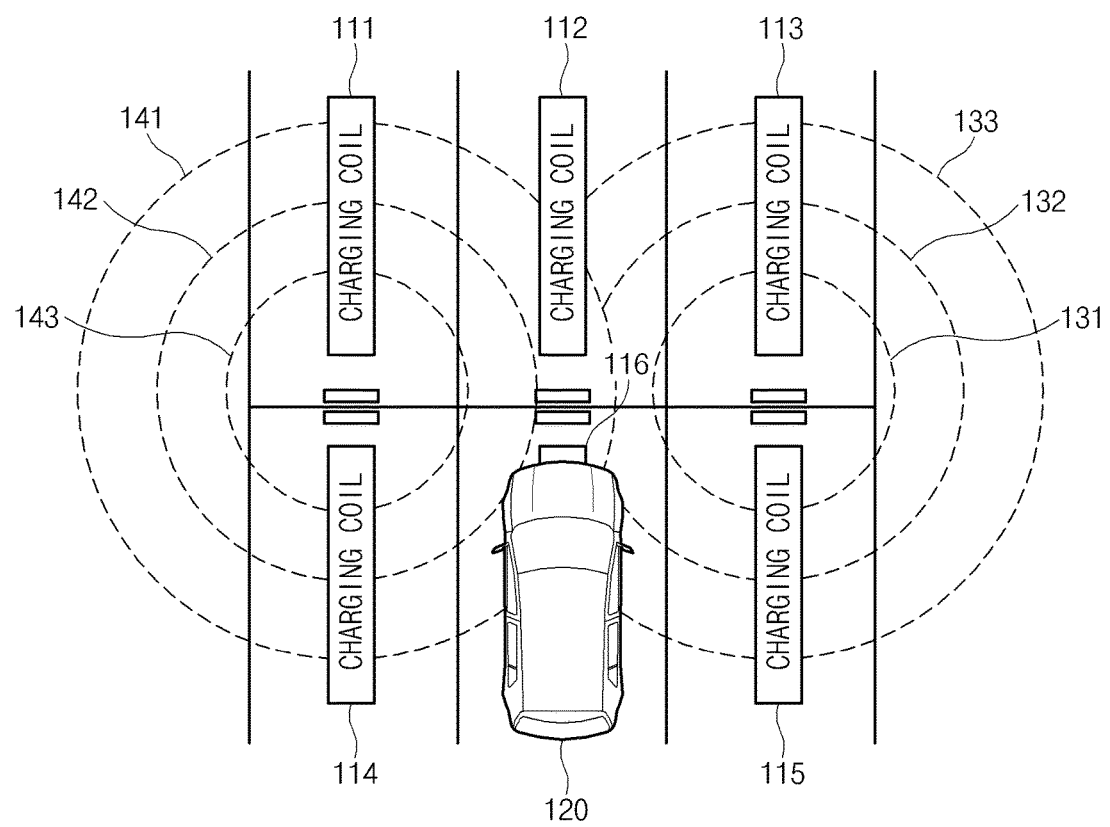
FIG. 1 is a schematic diagram illustrating a charging coil equipped in a parking space of a parking lot and an RSSI in response to the charging coil.

Advantages and features of the present invention and methods to achieve them will be elucidated from exemplary embodiments described below in detail with reference to the accompanying drawings. Therefore, the present invention is not limited to the exemplary embodiments set forth herein, but may be modified in many different forms. However, these embodiments are provided so that this disclosure will be thorough and complete, and will fully convey the technical spirit of the invention to those skilled in the art.

In the drawings, the embodiments of the present invention are not limited the illustrated specific form, but in order to clearly understand and/or easily embody the present invention, configurations of the present invention will be enlarged in the accompanying drawings. Herein, specific terms have been used, but are just used for the purpose of describing the present invention and are not used for qualifying the meaning or limiting the scope of the present invention, which is disclosed in the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present invention will be described in detail with reference to the accompanying drawings.

FIG. 1 illustrates a charging coil equipped in a parking space of a parking lot and RSSIs in response to the charging coil.

When a wireless charging system is installed in a parking lot, charging coils 111 to 116 may be installed at or near a floor (e.g., approximately ground level) of each parking space. A vehicle 120 which is parked in the parking space may be wirelessly charged with electric energy by a charging coil 116 which is installed at the floor.

Further, each of the charging coils 111 to 116 may transmit signals related to its own position. A received signal strength indicator (RSSI) in response to the transmission of the corresponding signal is in inverse proportion to a distance spaced apart from the corresponding charging coil. In particular, among left concentric circles 141 to 143, an inner circle 143 having a small diameter has an RSSI larger than that of an outer circle 141 having a large diameter. Among right concentric circles 131 to 133, an inner circle 131 having a small diameter has an RSSI larger than that of an outer circle 133 having a large diameter. Further, the parked vehicle 120 is wirelessly charged with power through the charging coil 116 which is disposed at a lower portion of the corresponding vehicle 120, but may measure the RSSIs in response to the transmission of the signals from the charging coils 111 to 115 which are disposed at the lower portion of the parking space around the vehicle.

As the result, the parked vehicle 120 receives the signals related to the positions of the charging coils 111 to 116 transmitted from the charging coils 111 to 116 to be able to calculate an RSSI array based on the measured RSSI.

Figure 2:
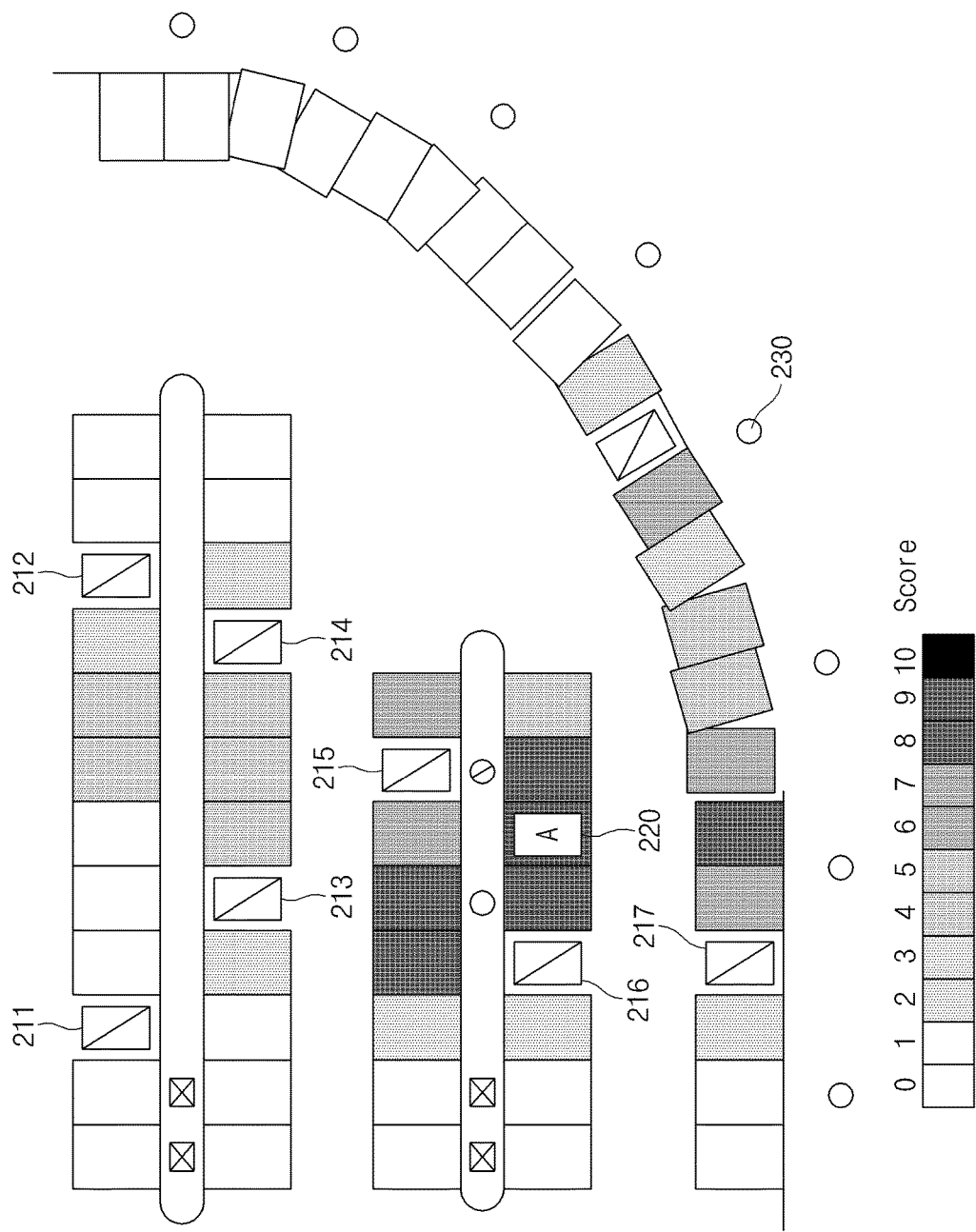
FIG. 2 is a schematic diagram representing the RSSI of the parking space within the parking lot by a gray scale in a method for pairing a wireless charging system to a vehicle according to an embodiment of the present invention.

FIG. 2 illustrates the RSSI of the parking space within the parking lot by a gray scale in a method for pairing a wireless charging system to a vehicle according to an embodiment of the present invention.

Referring to FIG. 2, values from 0 to 10 regarding a value of the measured RSSI are represented by a gray scale. Each square represents a parking space, and diagonal lines 211 at parking spaces 217 and 220 shown by a solid line within the square represent a parking space in which the parked vehicle is present. Further, a circle 230 outside the parking lot represents a tree or other object, as an example of the surrounding environment of the parking lot.

The gray scale of FIG. 2 represents the RSSI array for the charging coils disposed at the floors of the parking lot, which are received by a vehicle A parked in a parking space 220 among the parking spaces 211 to 217 and 220 in which parked vehicles are present. In particular, since the value of the gray scale is increased as the vehicle approaches the parking space A 220, the RSSI is shown by a dark color, and since the value of the gray scale is reduced as the vehicle is far away from the parking space 220, the RSSI is shown by a light color. As described above, a distance from a vehicle to a parking space which measures the RSSI and the RSSI are in inverse proportion to each other.

As illustrated in FIG. 2, when the RSSI array is represented by the gray scale, the RSSI array is more intuitively easily recognized at a glance than representing the corresponding value by number.

Figure 3:
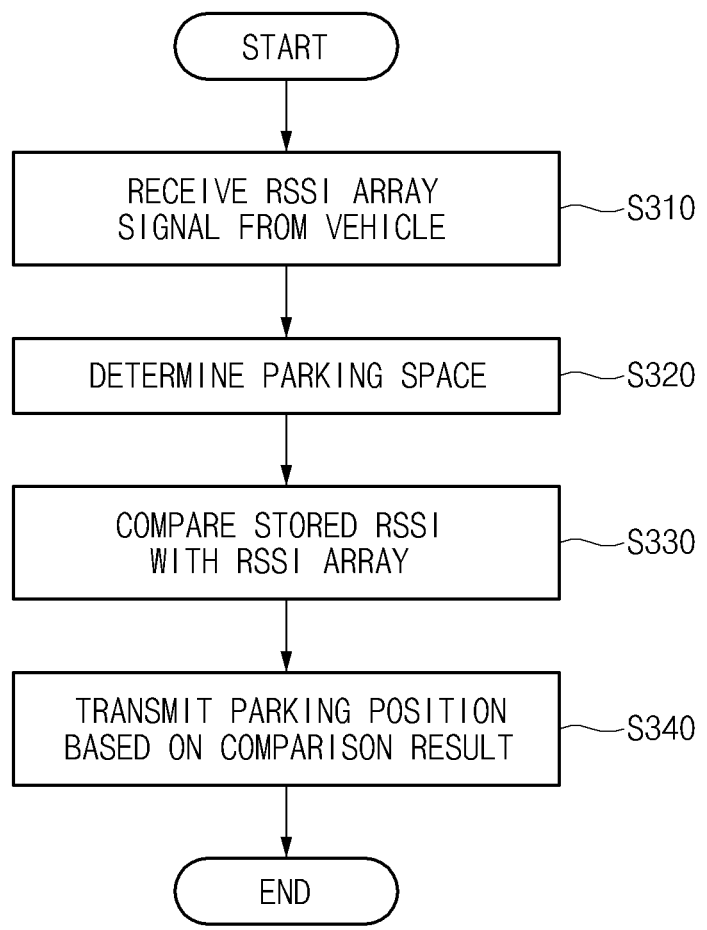
FIG. 3 is a flow chart illustrating a method for pairing a wireless charging system to a vehicle according to an embodiment of the present invention.

FIG. 3 is a flow chart illustrating a method for pairing a wireless charging system to a vehicle according to an embodiment of the present invention.

First, a first signal including positional information related to the parking space within the parking lot is transmitted through a processor which is included in a controller controlling the pairing of the wireless charging system to the vehicle.

Next, the processor receives a second signal transmitted from the vehicle (S310). Here, the second signal includes information on the received signal strength indicators (RSSI) array, in which the RSSI array may be determined by the plurality of signals which are present within the parking lot. In detail, the plurality of signals which are present within the parking lot may be the signals related to the positions of the charging coils which are described with reference to FIGS. 1 and 2.

Next, the processor determines the positions of the parking spaces of the parking lot based on the received second signal (S320).

Next, the processor compares the RSSI array which is previously stored in a repository with an RSSI array which is included in the second signal received in step S319 (S330). Here, the processor determines whether the RSSI array previously stored matches the RSSI array included in the second signal by using a signal processing algorithm.

Next, the processor transmits a third signal which provides a notification on the matching between the RSSIs indicating the pairing of the wireless charging system to the vehicle, to the vehicle (S340). Here, the vehicle receiving the third signal may determine an accurate position of a current charging coil depending on the matching between the RSSIs and enters an appropriate parking space without confusion based on the determination and is then parked, such that the vehicle may be charged with electric energy.

In particular, the first signal may be transmitted from the vehicle, and as the comparison result of the RSSI array previously stored with the RSSI array included in the second signal in step S330, if it is determined that the matching is not made, the processor stores a new RSSI array which is not matched in the repository. That is, the processor stores the unmatched RSSI array to store the latest parking space information, thereby updating the stored RSSI array.

As described above, the processor may recognize and store the RSSI array as an RSSI pattern and a detailed example thereof is the gray scale. Here, the RSSI pattern may be determined based on an environment (e.g., the tree 230 of FIG. 2) around the parking lot. Further, the second signal received by the vehicle may also be determined based on the repetitive attempt to put the corresponding vehicle into the parking space. Further, a GPS system may be used for the pairing of the wireless charging system to the vehicle according to the embodiment of the present invention. In this case, the corresponding vehicle may be more accurately guided to the parking space.

The positional information as described above may be represented by position coordinates, for example, longitude and latitude, and as illustrated in FIG. 1, the charging coil which is a targeted parking point may be disposed at or near a center of the parking space.

Further, the processor executing the above-mentioned several steps preferably is included in a separate controller closely positioned to the parking lot to be able to control the parking of the electric vehicle.

When the processor compares the RSSI array previously stored with the RSSI array included in the second signal in step S330 as described above, the processor may determine whether the position of the RSSI array previously stored matches the position of the RSSI array included in the second signal by using the signal processing algorithm.

Consequently, according to the method for pairing a wireless charging system to a vehicle according to the embodiment of the present invention, the position of the charging coil for efficient wireless charging may be accurately understood as the latest information even though the environment and time are changed and a driver rapidly and accurately may park his/her own vehicle based on the understood position and may wirelessly charge electric energy in the vehicle.

According to the embodiments of the present invention, the method for pairing a wireless charging system to a vehicle may provide the parking space for wireless charging by updating parking information provided from the plurality of signals within the parking lot.

Hereinabove, although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto. Considering the above contents, if the modifications and changes of the present invention belong to the range of the following claims and equivalents, the present invention is considered to include the changes and modifications of the present invention.

What is claimed is:

1. A method of pairing a wireless charging system to a vehicle, the method comprising steps of:
    transmitting, by a processor, a first signal including location information related to a parking space within a parking lot;
    receiving, by the processor, a second signal from the vehicle including an array of received signal strength indicators (RSSI), wherein the array is determined from a plurality of signals within the parking lot, wherein the RSSI is measured in response to the transmission of the first signal, the array of RSSI is calculated based on the measured RSSI, and a value of the measured RSSI is displayed by a gray scale;
    recognizing, by the processor, RSSI patterns in the calculated array of RSSI, wherein the RSSI patterns are recognized by the gray scale;
    storing, by the processor, the recognized RSSI patterns;
    determining, by the processor, a location of the parking space based on the received second signal;
    comparing, by the processor, the array of RSSI with previously stored arrays of RSSI;
    determining, by the processor, a match between the array of RSSI and one of the previously stored arrays of RSSI using a signal processing algorithm; and
    transmitting, by the processor, a third signal providing a match notification to the vehicle that indicates the pairing of the wireless charging system to the vehicle.

2. The method of claim 1, wherein the first signal is transmitted from the vehicle.

3. The method of claim 1, wherein the RSSI patterns are based on repeated parking attempts of the vehicle.

4. The method of claim 1, further comprising a step of:
using a global positioning system to pair the wireless charging system to the vehicle.

5. A non-transitory computer readable medium containing program instructions executed by a processor on a controller, the computer readable medium comprising:
   program instructions that transmit by a first signal including location information related to a parking space within a parking lot;
   program instructions that receive a second signal from the vehicle including an array of received signal strength indicators (RSSI), wherein the array is determined from a plurality of signals within the parking lot, wherein the RSSI is measured in response to the transmission of the first signal, the array of RSSI is calculated based on the measured RSSI, and a value of the measured RSSI is displayed by a gray scale;
   program instructions that recognize RSSI patterns in the calculated array of RSSI, wherein the RSSI patterns are recognized by the gray scale;
   program instructions that store the recognized RSSI patterns;
   program instructions that determine a location of the parking space based on the received second signal;
   program instructions that compare the array of RSSI with previously stored arrays of RSSI;
   program instructions that determine a match between the array of RSSI and one of the previously stored arrays of RSSI using a signal processing algorithm;
   program instructions that transmit a third signal providing a match notification to the vehicle that indicates the pairing of the wireless charging system to the vehicle; and
   program instructions that store the array of RSSI in response to determining that the array of RSSI is unmatched with one of the previously stored arrays of RSSI.

6. The method of claim 1, further comprising a step of:
in response to determining that the array of RSSI is unmatched with one of the previously stored arrays of RSSI, storing, by the processor, the unmatched array of RSSI.

* * * * *